J. SUTTER.
Device for Welding Together the Fag-Ends of Bars.
No. 159,468. Patented Feb. 2, 1875.
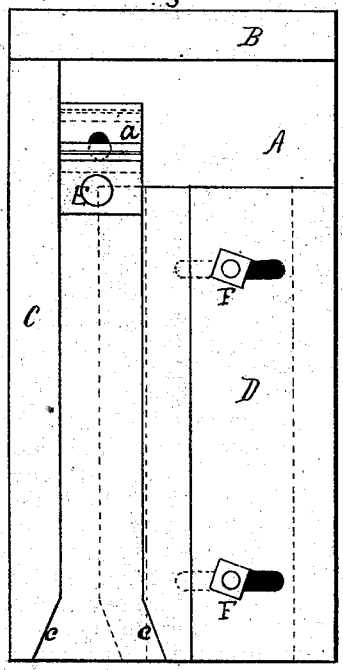
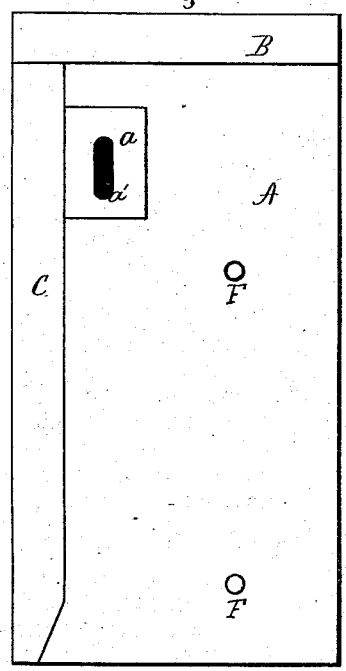
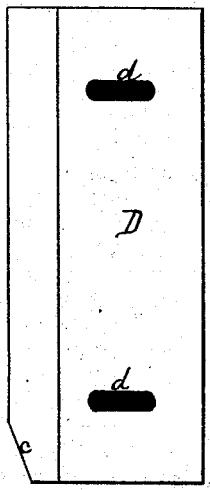
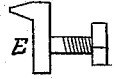
Witnesses
R. R. Baelz
Frederick Standish
Inventor
Jacob Sutter
by Bakewell & Kerr
Attys

UNITED STATES PATENT OFFICE.

JACOB SUTTER, OF PITTSBURG, PENNSYLVANIA.

IMPROVEMENT IN DEVICES FOR WELDING TOGETHER THE FAG-ENDS OF BARS.

Specification forming part of Letters Patent No. 159,468, dated February 2, 1875; application filed August 10, 1874.

*To all whom it may concern:*

Be it known that I, JACOB SUTTER, of Pittsburg, in the county of Allegheny and State of Pennsylvania, have invented a new and useful Improvement in Apparatus for Utilizing the Fag-Ends of Bar-Iron; and I do hereby declare the following to be a full, clear, and exact description thereof, reference being had to the accompanying drawing, making a part of this specification, in which—

Figure 1 is a plan view of my improved welding-groove; Fig. 2, a plan of the bed or furnace plate; Fig. 3, a detached view of the sliding or movable side; and Fig. 4, a similar view of the sliding gage or knife-edge.

Like letters refer to like parts in the several figures.

My invention relates to method and apparatus for utilizing the fag-ends of bars remaining in the manufacture of nuts, bolts, spikes, &c.; and it consists, first, in staving the ends of fags or the end of a fag and a bar together, while supported in a welding-groove, and when at a welding-heat, so as to obtain a weld or partial weld, whereby fags of bar-iron may be used without being previously fagoted and reworked, as has heretofore been necessary; secondly, in a welding-groove provided with a sliding knife or gage to prevent the end crease of the fag from closing under the thrust of the bar.

In the manufacture of bolts, nuts, and similar articles from bar-iron, when the greater part of the bar has been worked up, the remainder is too short to be conveniently and safely handled, and these fag-ends of the bars must be fagoted and reworked, involving much labor and expense. To overcome this difficulty, by welding the fag-end to another bar, or several fag-ends to form a bar, is my invention, to which end the welding-groove herein described has been devised by me.

In the drawing referred to, A represents the bed or furnace plate; B, the back plate; C, the fixed side plate; and D, the movable side plate. The bed or furnace plate A is provided with a recess, *a*, through which passes a slot, *a'*, extending for a great portion of the length of the recess *a'*, said recess being for the reception of the sliding knife or gage E, by which the crease of the fag is prevented from closing. The back plate, B, and side plate, C, may be fixed or movably connected to the bed-plate A; and in some cases the back plate, B, may be entirely dispensed with, as its main object is simply to relieve the knife-edge to a certain extent from the full force of the end thrust of the bar in welding the fags. E represents the sliding knife-edge working within the welding-groove, the object of which has been before stated. This knife-edge may be secured in position by a bolt passing through a slot in the bottom of the bed-plate A, and fastened in position by a nut, or may be fastened at the side and movable by means of a slot formed in the side plate, C, provided it is movable along the welding-groove, and can be fixed at any given point from the end of the groove, said point corresponding to the distance from the end of the fag to the crease. F are bolts or similar devices attached to the bed-plate A, and act as guides and means of securing the movable side plate, D. D is the movable side plate, provided with the slots *d*, corresponding with the bolts F of the bed-plate A, to permit of the adjustment of the side plate, D, and of its being secured in any fixed position. The side plates, C and D, are beveled at the points *c* to give a bell or funnel mouth opening to permit of the ready introduction of the bar.

The operation of this apparatus is as follows: In the manufacture of nuts or similar articles two or more nuts are cut from the bar at a time, and a creased portion of the bar is left to gage the following cut. The fag-end of a bar will, therefore, have, at a certain distance from the end thereof, a crease or partial division, indicating the breadth or width of the nut to be cut therefrom. These fag-ends are too short to be handled with ease, and it is my intention to weld several of these fag-ends together to form a new bar, or, what is equally desirable, to weld the fag-end onto a fresh bar; and for this purpose the fag-end and the end of the fresh bar being previously heated in a furnace, the fag-end is placed within the welding-groove, with the creased portion resting over the knife or gage E, (the gage and movable side having first been fixed to correspond with the creased end and width of the fag.) The fresh bar or additional fag-ends are then forced within the groove, the bell or funnel mouth of the groove facilitating this operation, and the meeting of the bars under the end thrust will be sufficient to cause them to weld, the crease or groove in the fag-end being prevented from closing by the knife-edge. The fag and fresh bar, having thus been welded, become as one bar to all intents and purposes, and can be used as a single bar in the manufacture of nuts, &c. The same may be said of several fag-ends thus united.

The advantage of this invention is, that I am enabled to utilize the fag-ends of bars arising in various manufactures without the tedious methods of fagoting and reworking, which have heretofore been necessary.

I am aware that it is common to make what is known as a "butt-weld" or jump-weld by bringing the ends of bars in forcible contact when at a welding-heat, and therefore disclaim such a method of welding.

Having thus described my invention, what I claim, and desire to secure by Letters Patent, is—

1. As an improvement in the method of preparing the fag-ends of bar-iron, for use in the arts, bringing said fag-ends to a welding-heat, and welding them together, end to end, or to the end of a similarly-heated bar, by successively forcing one against the other while confined in a straight groove, substantially as described.

2. The combination of the bed-plate, the fixed and movable sides, and the adjustable knife or gage, substantially as and for the purpose specified.

In testimony whereof I, the said JACOB SUTTER, have hereunto set my hand.

JACOB SUTTER.

Witnesses:
  T. B. KERR,
  JAMES I. KAY.